United States Patent [19]

Bourdois et al.

[11] 4,265,572

[45] May 5, 1981

[54] PROCESS FOR THE PNEUMATIC TRANSFER OF A PULVERULENT MATERIAL

[75] Inventors: Claude Bourdois, Palaiseau; Maurice Decolle, Morangis; Michel Ferard, Sartrouville; Paul Marchal, Gif-Sur-Yvette, all of France

[73] Assignee: Commissariat a l'Energie Atomique, Paris, France

[21] Appl. No.: 64,873

[22] Filed: Aug. 8, 1979

[30] Foreign Application Priority Data

Aug. 11, 1978 [FR] France .................. 78 23733

[51] Int. Cl.$^3$ ............................................. B65G 53/24
[52] U.S. Cl. .................................... 406/114; 406/137; 406/141; 406/152
[58] Field of Search ............... 406/113, 114, 115, 136, 406/137, 141, 151, 152, 153

[56] References Cited

U.S. PATENT DOCUMENTS

| | | | |
|---|---|---|---|
| 3,097,017 | 7/1963 | Turner et al. | 406/137 |
| 3,994,532 | 11/1976 | Hahn | 406/152 X |
| 4,029,364 | 6/1977 | Salzer | 406/141 X |

FOREIGN PATENT DOCUMENTS 310224 1/1919 Fed. Rep. of Germany .......... 406/152

*Primary Examiner*—Jeffrey V. Nase
*Attorney, Agent, or Firm*—Pearne, Gordon, Sessions, McCoy & Granger

[57] ABSTRACT

Process for the pneumatic transfer of a pulverulent material contained in a cylindrical container, wherein it comprises the introduction, via a sealed passage located in the upper part and in the axis of the container, of a suction member which is movable in translation along said axis and having at its suction end located in the container an annular nozzle which is able to direct a gas jet towards the walls of the container so as to ensure the scavenging of said walls during suction, the level of said annular nozzle in the container being maintained constantly above the level of the pulverulent material contained therein until all the material has been sucked out, including that on the bottom of the container. The process is performed by an apparatus for the pneumatic transfer of a pulverulent material comprising a cylindrical container containing the pulverulent material and pneumatic extraction duct for emptying the container. As a result of the invention it is possible to extract all the material contained in a container, particularly when the material is of a clogging or tacky nature.

7 Claims, 2 Drawing Figures

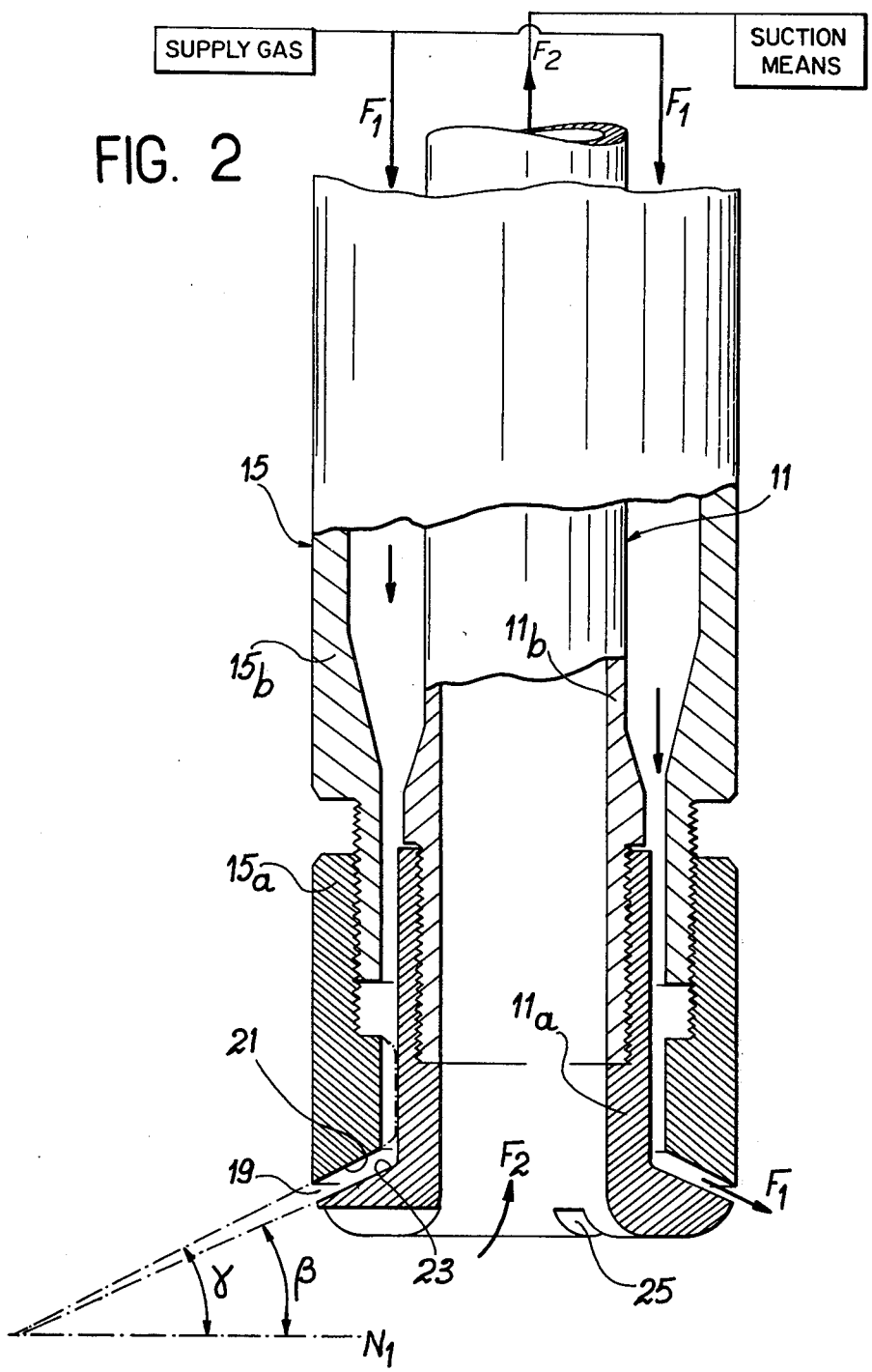

PROCESS FOR THE PNEUMATIC TRANSFER OF A PULVERULENT MATERIAL

BACKGROUND OF THE INVENTION

The present invention relates to a process for the pneumatic transfer of a pulverulent material, as well as to an apparatus for performing this process.

More specifically it applies to the pneumatic transfer of a pulverulent material contained in a container by pneumatic means ensuring the complete emptying of the container by suction of the pulverulent material contained therein.

The presently known means for the pneumatic transfer of a pulverulent material use pneumatic devices such as exhausters or suction nozzles operating under vacuum or overpressure and have the following disadvantages:

(a) they do not function in a sealed closed circuit.

(b) they do not destroy during suction the walls of craters formed in the container.

(c) they do not ensure the extraction of all the product (powder or granules), which is of a clogging or tacky nature, contained in said container by pneumatic scavenging of the walls and bottom.

BRIEF SUMMARY OF THE INVENTION

The object of the present invention is to obviate these disadvantages and makes it possible under satisfactory conditions to ensure the extraction of all the pulverulent material contained in a container, more particularly a clogging pulverulent material, in the form of powder or granules.

The present invention relates to a process for the pneumatic transfer of a pulverulent material contained in a cylindrical container, wherein it comprises the introduction by means of a sealed passage located in the upper part and in the axis of the container a suction member which is movable in translation along said axis and having at its suction end located in the container an annular nozzle which is able to direct a gas jet towards the walls of the container so as to ensure the scavenging of said walls during suction, the level of said annular nozzle in the container being maintained constantly above the level of the pulverulent material contained therein until all the material has been sucked out, including that on the bottom of the container.

According to an advantageous feature of the process the size of the annular nozzle opening is regulated so that the gas jet converges towards the walls of the container during transfer.

The apparatus for the pneumatic transfer of a pulverulent material according to the invention comprises a container containing the pulverulent material and pneumatic means for emptying said container, wherein said pneumatic emptying means comprise a suction member which can be sealingly mounted in the axis of the container and can be displaced in translation along said axis, the suction member having two coaxial tubes, called the first tube and the second tube, open at their lower ends, said first tube defining in the suction member a central duct for the extraction of the pulverulent material to be transferred and the said second tube defines with the first tube an annular duct for introducing a fluid into said container, said first and second tubes having at their lower end a shape such that when the suction member is mounted in the axis of the container the annular duct issues into the container by an annular nozzle which can direct a gas jet onto the side walls of the container by orienting the jet towards the bottom of the container, means for supplying gas to the annular duct and suction means for extracting the said gas and the said pulverulent material by the central extraction duct, the said first and second tubes being regulatable in translation with respect to one another in such a way that it is possible to control the dimensions of the opening of the nozzle so that the gas jet leaving the annular nozzle converges on the side wall of the container, whereby when the suction member is mounted in the axis of the container the convergence level of the gas jet on the container walls is maintained substantially level with the pulverulent material level in the container.

The apparatus as characterised hereinbefore more particularly has the advantage of ensuring the pneumatic transfer of all the pulverulent material contained in the container. Thus, due to the particular shape of the annular nozzle permitting the direction of a gas jet onto the container side walls substantially level with the material along the container walls it is possible to drive into the extraction duct all the pulverulent material particles, particularly those tending to stick to the container walls.

Moreover, by distributing the gas jet through an annular nozzle a dynamic confinement is obtained, which isolates the lower part of the container, preventing pulverulent material particles from being dispersed in the upper part of the container and consequently preventing them from being displaced by suction in the extraction duct.

Moreover the introduction of a gas into the container by the annular nozzle makes it possible to destroy the sides of the craters which are liable to form during the suction of the pulverulent material.

The arrangement of two tubes forming the suction member has proved to be particularly advantageous because it is consequently possible to regulate the opening of the annular nozzle as a function of the container dimensions in such a way that the gas jet leaving the annular nozzle can converge on the container side walls.

According to another feature of the pneumatic transfer apparatus according to the invention the bottom of the container has a shape adapted to that of the lower part of the extraction duct in such a way that when the suction member is mounted in the axis of the container the gas jet discharged by the annular nozzle displaces the pulverulent material towards the central extraction duct of the suction member.

According to another feature of the apparatus according to the invention the lower part of the extraction duct has a cross-section which decreases from its lower end to its upper end.

Advantageously the lower part of the extraction duct is defined by an extension of the inner wall of the first tube, said extension having in part the shape of a concave surface.

In this case the bottom of the container is preferably such that it has a convex surface to the right of said extraction duct, said convex surface being connected to the container side walls via at least one concave surface.

By associating in this way a suction member having at its lower end a shape adapted to that of the bottom of the container it is possible to ensure the complete emptying of the container under the best possible conditions, aiding at the end of the operation the displacement of the final material particles on the bottom of the container.

According to a preferred embodiment of the apparatus according to the invention the annular nozzle is defined by an extension of the inner wall of the second tube and by an extension of the outer wall of the first tube, said extension of the inner wall of the first tube forming a frustum-shaped wall, whereof each generating line defines with a horizontal plane an acute angle $\beta$ and said extension of the inner wall of the second tube forming a frustum-shaped wall whereof each generating line defines with a horizontal plane an acute angle $\gamma$ which exceeds angle $\beta$.

In this embodiment the angles $\beta$ and $\gamma$ are selected as a function of the cross-section of the extraction member and of the cross-section of the container in such a way that when the suction member is mounted in the axis of the container the intersection circle of the two cones with semi-angles $(\pi/2-\beta)$ and $(\pi/2-\gamma)$ defining the said frustum-shaped walls is located on the container side walls at a level $N_1$ with respect to the bottom of the container which is at the most equal to level $N_2$ of the lower end of the suction member.

BRIEF DESCRIPTION OF THE DRAWINGS

The invention will be described in greater detail hereinafter relative to non-limitative embodiments and with reference to the attached drawings, wherein show:

FIG. 2 in detail the lower part of the suction member of the pneumatic transfer apparatus according to the invention.

DETAILED DESCRIPTION OF THE PREFERRED EMBODIMENTS

Figure 1:
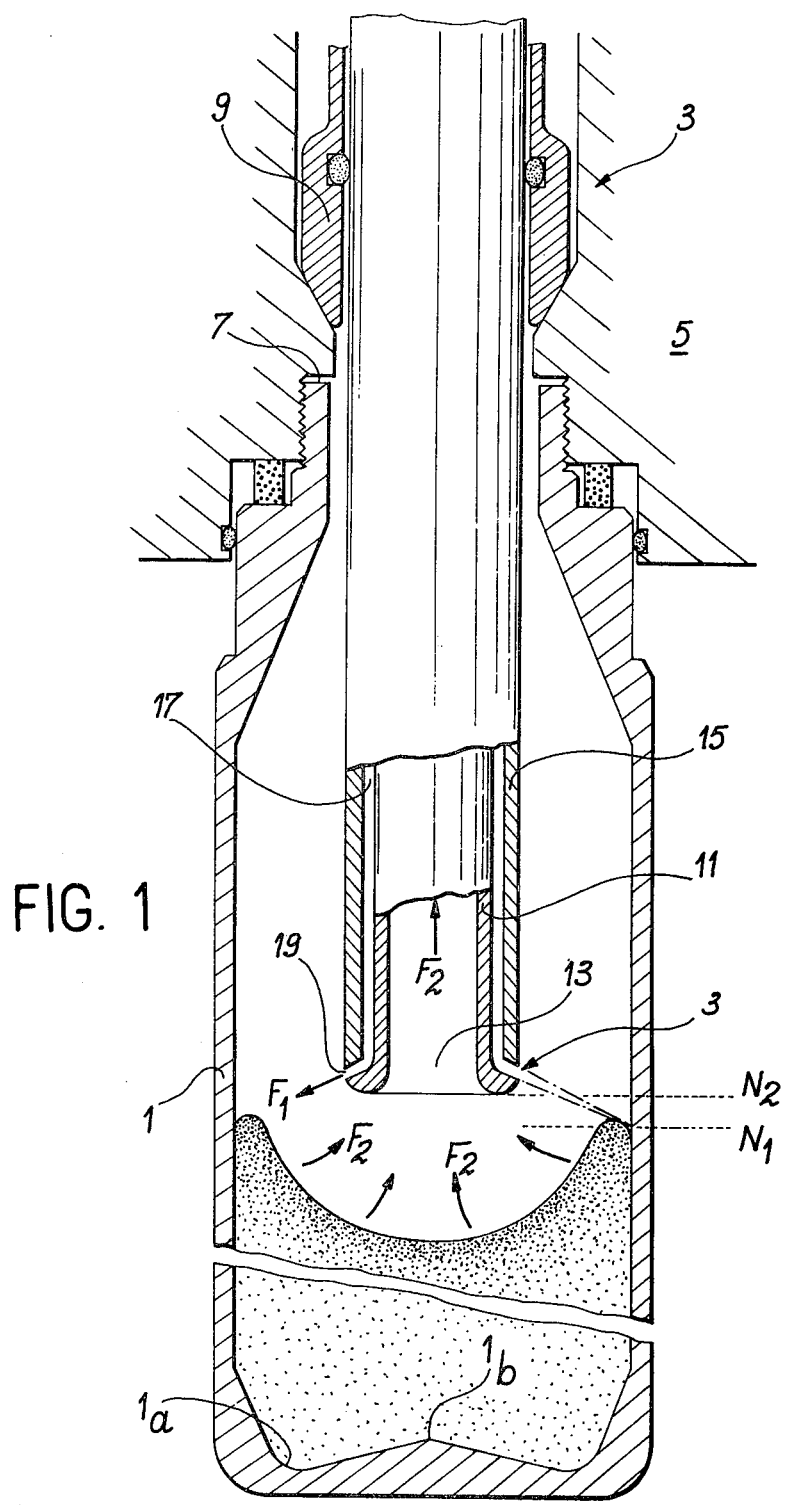
FIG. 1 a diagrammatic view of an apparatus for the pneumatic transfer of pulverulent material according to the invention.

On referring to FIG. 1 it is possible to see that the pneumatic transfer apparatus comprises a cylindrical container 1 having a circular or polygonal cross-section open at its upper end and a suction member 3 sealingly mounted in the axis of container 1.

Container 1 and suction member 3 are mounted on a support 5. For this purpose container 1 has at its upper end an external thread which co-operates with a corresponding thread provided in a shoulder 7 of support 5 and the suction member 3 is sealingly mounted in a member 9 which ensures the sealing of container 1 and it can be positioned at different levels with respect to the bottom of container 1.

According to the invention the suction member comprises two coaxial tubes, a first tube 11 which defines in the suction member a central extraction duct 13 and a second tube 15 which defines with said first tube an annular duct 17 for the introduction of a fluid into the container. At their lower ends tubes 11 and 15 have a shape such that the annular duct 17 issues into container 1 by an annular nozzle 19 able to direct a gas jet onto the side walls of container 1, whilst also orienting the gas jet towards the bottom of the container.

As can be seen in greater detail in FIG. 2 the annular nozzle 19 is defined by an extension 21 of the inner wall of second tube 15 and by an extension 23 of the outer wall of first tube 11. The extensions 21 and 23 have the shape of frustum-shaped walls, whose generating lines respectively define with a horizontal plane acute angles $\gamma$ and $\beta$.

It should be noted that the acute angle $\gamma$ defined by a generating line of the frustum-shaped wall 21 with a horizontal plane is greater than the angle $\beta$ defined by a generating line of the frustum-shaped wall 23 with a horizontal plane.

The gas jet leaving annular nozzle 19 is directed towards the container side walls and is also directed towards the bottom of the container, permitting the cleaning of said bottom when the nozzle reaches the bottom of the container.

FIG. 2 also shows that the lower part 11a of the first tube 11 and the lower part 15a of the second tube 15 are regulatable in translation with respect to one another in order to regulate the dimensions of the opening of annular nozzle 19.

To this end portion 15a has a thread which is able to co-operate with a corresponding thread of the upper portion 15b of tube 15 in such a way that it is possible to displace portion 15a relative to portion 15b. In the same way portion 11a has a thread which co-operates with a corresponding thread of portion 11b of tube 11 in such a way that said portion 11a can be displaced in translation.

This method of fitting portions 15a and 11a has proved to be particularly advantageous, because it permits an increase or decrease in the opening of annular nozzle 19 and consequently permits the adaptation of the dimensions of said opening in such a way that on leaving the annular nozzle the gas jet guided by the frustum-shaped walls defined by the inner extension of the second tube and the outer extension of the first tube substantially converges on the side walls of container 1 at the level reached by the pulverulent material in said container.

This regulation could obviously also be obtained by the translation of one tube relative to the other controlled and locked at the other end of the two said tubes. This regulation is dependent on the dimensions of the container and for a given container is maintained constant throughout the emptying operation.

Finally it should be noted that the inner wall of the first tube 11 has at is lower end an extension 25, whose shape is such that the central extraction duct has in its lower portion a cross-section which regularly decreases from its lower end to its upper end.

In the embodiment shown in this drawing the extension 25 has in part the shape of a concave surface which is adapted to the shape of the bottom of container 1, which has a convex surface 1b to the right of the extraction duct 13, said convex surface being connected to the container side walls via a concave surface.

This complimentary shaping between the lower end of the extraction duct and the bottom of the container has the advantage of permitting a satisfactory displacement of the pulverulent material, because the shapes are adjusted as a function of the dimensions in such a way that the gas flows from the annular nozzle are guided by the walls and the bottom of the container towards the inside of the extraction duct.

It is also pointed out that in this constructional embodiment of the annular nozzle the angles $\beta$ and $\gamma$ which respectively defined the slope of the frustum-shaped walls 23 and 21 relative to a horizontal plane are selected as a function of the cross-section of the suction member and the cross-section of the container in such a way that, when the suction member is mounted in the container 1, the intersection circle of the two cones of semi-angles $(\pi/2-\beta)$ and $(\pi/2-\gamma)$ defining the frustum-shaped walls is located on the container side walls at a level $N_1$ relative to the bottom of the container which is at the most equal to level $N_2$ of the lower end of said suction member. It is also pointed out that the difference between the said levels $N_2$ and $N_1$ is selected as a function of the nature of the powder to be transferred.

The apparatus functions in the following manner. With the container filled with a possibly clogging pulverulent material the container is completely isolated by sealingly mounting the suction member 3 in the corresponding opening of the container via member 9. The upper part of annular duct 17 is then linked to a gas source, such as air, nitrogen, argon or a neutral gas and the extraction duct 13 is connected by its upper part to a not shown suction device. Thus, taking account of the pressure difference established between the two ducts, the gas introduced into duct 17 is evacuated by annular nozzle 19 in the form of a pressurised gas jet in the direction of arrows $F_1$. It is then sucked into the extraction duct 13 in the direction of arrows $F_2$ and displaces with it the pulverulent material present in the container. The suction member is lowered into the container in proportion to the discharge of the powder in such a way that the gas jet converges along the walls of the container substantially at the level reached by the material along said walls.

When the product to be transferred has tacky and clogging characteristics and the powder particles of a high density the powder may have a tendancy to form craters and in this case the suction member can be moved during the operation so as to position it by rising and falling movements at different levels in such a way that the flow leaving the annular nozzle destroys the craters and then directly strikes the side walls of container 1.

In exemplified manner the geometrical characteristics of a pneumatic transfer apparatus according to the invention are given.

In the said apparatus the container is cylindrical and has a circular cross-section of diameter 141 mm, the container bottom having in the container axis a convex surface with a radius of curvature of about 20 mm, which is connected to the container side walls via two concave surfaces with a radius of curvature of 15 mm.

In this example the suction member has a first tube with an internal diameter of 25 mm and a second tube with an external diameter of 50 mm which define between them in the lower portion thereof an annular duct having a thickness of 1 mm.

The frustum-shaped walls defining the annular nozzle have a slope such that the angle $\beta$ is equal to 8° and the angle $\gamma$ is equal to 9°.

In its lower part the first tube has an extension having in part the shape of a concave surface.

It is pointed out that with such an apparatus it is possible to provide a gas flow of the order of 30 m³/h, leading to the gas being discharged from the nozzle at velocities of about 25 m/s.

Thus, a complete emptying of the container is obtained and the quantity of non-transferred powder is below the detectable limit.

It is pointed out that in this construction it is advantageous for the walls of the container and the suction member to be machined so as to make them as smooth as possible, for example by using microshot. Means for supplying the duct 17 with a gas and the suction means connected to the duct 13, are very well known in the art, and therefore are not illustrated in the drawing.

The invention is not limited to the embodiments described and represented hereinbefore and various modifications can be made thereto without passing beyond the scope of the invention.

What is claimed is:

1. An apparatus for the pneumatic transfer of a pulverulent material comprising a container containing the pulverulent material and pneumatic means for emptying said container, wherein said pneumatic emptying means comprise a suction member which can be sealingly mounted in the axis of the container and can be displaced in translation along said axis, the suction member having two coaxial tubes, called the first tube and the second tube, open at their lower ends, said first tube defining in the suction member a central duct for the extraction of the pulverulent material to be transferred and the said second tube defines with the first tube an annular duct for introducing a fluid into said container, said first and second tubes having at their lower end a shape such that when the suction member is mounted in the axis of the container the annular duct issues into the container by an annular nozzle which can direct a gas jet onto the side walls of the container by orienting the jet towards the bottom of the container, means for supplying gas to the annular duct and suction means for extracting the said gas and the said pulverulent material by the central extraction duct, the said first and second tubes comprising means for controlling the dimension of the nozzle opening so that the gas jet having the annular nozzle converges on the side wall of the container, these means controlling the translation of said first and second tubes with respect to each other, whereby when the suction member is mounted in the axis of the container the convergence level of the gas jet on the container walls is maintained substantially level with the pulverulent material level in the container.

2. An apparatus according to claim 1, wherein the bottom of the container has a shape adapted to that of the lower part of the extraction duct in such a way that when the suction member is mounted in the axis of the container the gas jet discharged by the annular nozzle displaces the pulverulent material towards the central extraction duct of the suction member.

3. An apparatus according to claim 1, wherein the lower part of the extraction duct has a cross-section which decreases from its lower end to its upper end.

4. An apparatus according to claim 3, wherein the lower part of the extraction duct is defined by an extension of the inner wall of the first tube, said extension having in part the shape of a concave surface.

5. An apparatus according to claim 4, wherein the bottom of the container is such that it has a convex surface to the right of the extraction duct, said convex surface being connected to the container side walls via at least one concave surface.

6. An apparatus according to claim 1, wherein the annular nozzle is defined by an extension of the inner wall of the second tube and by an extension of the outer wall of the first tube, said extension of the inner wall of the first tube forming a frustum-shaped wall, whereof each generating line defines with a horizontal plane an acute angle $\beta$ and said extension of the inner wall of the second tube forming a frustum-shaped wall whereof each generating line defines with a horizontal plane an acute angle $\gamma$ which exceeds angle $\beta$.

7. An apparatus according to claim 6, wherein the angles $\beta$ and $\gamma$ are selected as a function of the cross-section of the extraction member and of the cross-section of the container in such a way that when the suction member is mounted in the axis of the container the intersection circle of the two cones with semi-angles $(\pi/2-\beta)$ and $(\pi/2-\gamma)$ defining the said frustum-shaped walls is located on the container side walls at a level $N_1$ with respect to the bottom of the container which is at the most equal to level $N_2$ of the lower end of the suction member.

* * * * *